United States Patent
Ghumare et al.

(10) Patent No.: US 10,240,077 B2
(45) Date of Patent: Mar. 26, 2019

(54) LOW DENSITY OIL EXTERNAL EMULSION WITH GELLED INTERNAL PHASE AS A GRAVEL PACKING CARRIER FLUID

(71) Applicant: Halliburton Energy Services, Inc., Houston, TX (US)

(72) Inventors: Anant Kanhoba Ghumare, Nashik (IN); Lalit Pandurang Salgaonkar, Pune (IN); Prerana Umesh Suryawanshi, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 66 days.

(21) Appl. No.: 15/310,411

(22) PCT Filed: Jun. 11, 2014

(86) PCT No.: PCT/US2014/041917
§ 371 (c)(1),
(2) Date: Nov. 10, 2016

(87) PCT Pub. No.: WO2015/191062
PCT Pub. Date: Dec. 17, 2015

(65) Prior Publication Data
US 2017/0218254 A1    Aug. 3, 2017

(51) Int. Cl.
*C09K 8/502* (2006.01)
*C09K 8/74* (2006.01)
*E21B 43/04* (2006.01)

(52) U.S. Cl.
CPC ............... *C09K 8/502* (2013.01); *C09K 8/74* (2013.01); *E21B 43/04* (2013.01);
(Continued)

(58) Field of Classification Search
None
See application file for complete search history.

(56) References Cited

U.S. PATENT DOCUMENTS 5,175,278 A    12/1992  Peik et al.
6,631,764 B2  10/2003  Parlar et al.
(Continued)

FOREIGN PATENT DOCUMENTS

WO    2008096164    8/2008

OTHER PUBLICATIONS

International Search Report and Written Opinion of PCT Application No. PCT/US2014/041917 dated Feb. 17, 2015: pp. 1-14.
(Continued)

*Primary Examiner* — Anurada Ahuja
(74) *Attorney, Agent, or Firm* — Chamberlain Hrdlicka (57) ABSTRACT

A subterranean treatment fluid may include an invert emulsion including a clarified diutan-based gelled aqueous internal phase and a mineral oil-based external phase, and an acid composition. The acid composition may include at least one acid selected: formic acid, acetic acid, propionic acid, lactic acid, glycolic acid, and combinations thereof, at least one acid-generating compound selected from: an ester; an aliphatic polyester; an ortho ester; a poly(ortho ester); an ortho ether; a poly(ortho ether); a lactide; a poly(lactide); a glycolide; a poly(glycolide); an ε-caprolactone; a poly(ε-caprolactone); a hydroxybutyrate; a poly(hydroxybutyrate); an anhydride; a poly(anhydride); an aliphatic carbonate; an aliphatic polycarbonate; an amino acid; a poly(amino acid), and combinations thereof, or a combination of the at least one acid and the at least one acid-generating compound. The subterranean treatment fluid may have a density less than water.

16 Claims, 1 Drawing Sheet

(52) U.S. Cl.
CPC ...... *C09K 2208/26* (2013.01); *C09K 2208/30* (2013.01); *C09K 2208/32* (2013.01)

(56) References Cited

U.S. PATENT DOCUMENTS

| | | | |
|---|---|---|---|
| 7,584,791 B2* | 9/2009 | Robb | C09K 8/68 |
| | | | 166/279 |
| 7,910,524 B2 | 3/2011 | Welton et al. | |
| 7,960,315 B2 | 6/2011 | Welton et al. | |
| 2005/0250652 A1* | 11/2005 | Taylor | C09K 8/36 |
| | | | 507/203 |
| 2006/0272815 A1 | 12/2006 | Jones et al. | |
| 2008/0194427 A1* | 8/2008 | Welton | C09K 8/68 |
| | | | 507/90 |
| 2012/0090848 A1* | 4/2012 | Reddy | C09K 8/08 |
| | | | 166/308.2 |
| 2012/0258894 A1* | 10/2012 | Eoff | C09K 8/035 |
| | | | 507/222 |
| 2013/0020081 A1 | 1/2013 | Maghrabi et al. | |
| 2013/0133892 A1 | 5/2013 | Salgoankar et al. | |

OTHER PUBLICATIONS

Diltz et al., "Location of O-acetyl groups in S-657 using the reductive-cleavage method," Carbohydrate Research, 2001, vol. 331: pp. 265-270.

Donaldson et al., SPE 71669: "Invert Gravel Pack Carrier Fluid," Society of Petroleum Engineers, 2001 SPE Annual Technical Conference and Exhibition, Lousiana, 2001: pp. 1-14.

* cited by examiner

LOW DENSITY OIL EXTERNAL EMULSION WITH GELLED INTERNAL PHASE AS A GRAVEL PACKING CARRIER FLUID

FIELD

The present disclosure is related to the field of producing crude oil or natural gas from subterranean formations. More specifically, the present disclosure generally relates to methods for stimulating oil or gas production from a well.

BACKGROUND

Open-hole gravel packing may be performed after running a sand control screen assembly to an objective depth inside an uncased section. Many times, this technique faces some challenges mainly in deep water surroundings where the annulus sand screen and open hole may experience collapsed sections, high leak-off zones, or fractures.

An "alternate path technique" (shunt tube) has been developed to achieve a complete gravel pack, which is crucial for these high cost wells to bypass any bridge that may form in the annulus. This gravel packing technique needs a precise fluid that can carry gravel particles or proppant using an alternate path.

Typically, non-aqueous fluid (NAF) is used when drilling through productive shale sections. Once the open hole is in place, displacing the NAF to completion brine in presence of sensitive shale can avoid the screens from reaching the required total depth. Running the screens in NAF can significantly increase the chances of a successful screen installation into the open hole. A gravel packing fluid that has the requisite carrying properties and which is compatible with the NAF is used in a technique referred to as non-aqueous fluid packing (NAFPac) when dealing with shale formations.

Lowering the density of the fluid is a way of reducing the overbalance pressure and is an important control to use when dealing with a low operating pressure envelop or when operating near low pressure boundaries.

BRIEF DESCRIPTION OF THE DRAWINGS

The accompanying drawings, which are included to provide a further understanding of the disclosure and are incorporated in and constitute a part of this specification, illustrate preferred embodiments of the disclosure and together with the detailed description serve to explain the principles of the disclosure. In the drawings.

DETAILED DESCRIPTION OF THE PREFERRED EMBODIMENTS

Systems and methods are described for subterranean treatment fluids. In particular, to systems and methods for gravel packing operations. The examples described herein relate to low density oil external emulsions with gelled internal phases for illustrative purposes only. It is understood that the description herein can refer to any suitable subterranean treatment fluids for use with any subterranean formations. In particular, the systems and methods may be used wherever use of subterranean treatment fluids is desirable.

A subterranean treatment fluid may include an invert emulsion including a clarified diutan-based gelled aqueous internal phase and a mineral oil-based external phase, and an acid composition. The acid composition may include at least one acid selected from: formic acid, acetic acid, propionic acid, lactic acid, glycolic acid, and combinations thereof, at least one acid-generating compound selected from: an ester; an aliphatic polyester; an ortho ester; a poly(ortho ester); an ortho ether; a poly(ortho ether); a lactide; a poly(lactide); a glycolide; a poly(glycolide); an ε-caprolactone; a poly(ε-caprolactone); a hydroxybutyrate; a poly(hydroxybutyrate); an anhydride; a poly(anhydride); an aliphatic carbonate; an aliphatic polycarbonate; an amino acid; a poly(amino acid), and combinations thereof, or a combination of the at least one acid and the at least one acid-generating compound. The subterranean treatment fluid may have a density less than water.

A method may include providing the subterranean treatment fluid including a plurality of particulates, contacting a portion of a subterranean formation with the subterranean treatment fluid, and depositing at least a portion of the plurality of particulates in a portion of the subterranean formation to form a gravel pack.

Definitions and Usages

General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

As used herein, a subterranean formation having greater than about 50% by weight of inorganic carbonate materials is referred to as a "carbonate formation." For matrix acidizing techniques in a carbonate formation, the carbonate formation preferably is greater than about 80% by weight of inorganic carbonate materials. For example, limestone is essentially calcium carbonate. Dolomite is essentially a combination of calcium carbonate and magnesium carbonate, wherein at least 50% of the cations are magnesium.

As used herein, a subterranean formation having greater than about 50% by weight of inorganic siliceous materials (for example, sandstone) is referred to as a "sandstone formation."

Well Servicing and Fluids

To produce oil or gas from a reservoir, a well is drilled into a subterranean formation, which may be the reservoir or adjacent to the reservoir.

Well services are designed to facilitate or enhance the production of desirable fluids such as oil or gas from or through a subterranean formation. A well service usually involves introducing a fluid into a well.

For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation.

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a line pipe, and a transportation pipe.

As used herein, a "fluid" broadly refers to any fluid adapted to be introduced into a well for any purpose. A fluid can be, for example, a drilling fluid, a setting composition, a treatment fluid, or a spacer fluid. If a fluid is to be used in a relatively small volume, for example less than about 100 barrels (about 4,200 US gallons or about 16 m$^3$), it is sometimes referred to as a wash, dump, slug, or pill.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical.

Complex wells include deviated wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate.

It should be understood that the terms "particle" and "particulate," includes all shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

Solubility

A substance is considered to be "soluble" in a liquid if at least 10 grams of the substance can be dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

The "source" of a chemical species in a solution or in a fluid composition can be a material or substance that is itself the chemical species, or that makes the chemical species chemically available immediately, or it can be a material or substance that gradually or later releases the chemical species to become chemically available in the solution or the fluid.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (that is, shear rate) than simple linearity. Therefore, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Like other physical properties, the viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or 50 viscometer or a CHANDLER™ 5550 HPHT viscometer. Such a viscometer measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

In general, a FANN™ Model 35 viscometer can be used for viscosity measurements of less than about 30 mPa·s (cP). In addition, the Model 35 does not have temperature and pressure controls, so it is used for fluids at ambient conditions (that is, Standard Laboratory Conditions). Except to the extent otherwise specified, the apparent viscosity of a fluid having a viscosity of less than about 30 cP (excluding any suspended solid particulate larger than silt) is measured with a FANN™ Model 35 type viscometer with a bob and cup geometry using an R1 rotor, B1 bob, and F1 torsion spring at a shear rate of 511 sec$^{-1}$ (300 rpm) and at a temperature of 77° F. (25° C.) and a pressure of 1 atmosphere.

A substance is considered to be a fluid if it has an apparent viscosity less than 5,000 mPa·s (cP) (independent of any gel characteristic). For reference, the viscosity of pure water is about 1 mPa·s (cP).

As used herein, for the purposes of proppant fracturing a fluid is considered to be "viscous" if it has an apparent viscosity of 10 mPa·s (cP) or higher. The viscosity of a viscous fluid is considered to break or be broken if the viscosity is greatly reduced. Preferably, although not necessarily for all applications depending on how high the initial viscosity of the fluid, the viscous fluid breaks to a viscosity of less than 50% of the viscosity of the maximum viscosity or less than 5 mPa·s (cP).

Historically, to be considered to be suitable for use as a carrier fluid for a proppant for conventional reservoirs or applications such as gravel packing, it has been believed that a crosslinked gel needs to exhibit sufficient viscoelastic properties, in particular relatively high viscosities (for example, at least about 300 mPa·s (cP) at a shear rate of 100 sec-1).

Permeability

Permeability refers to how easily fluids can flow through a material. For example, if the permeability is high, then fluids will flow more easily and more quickly through the material. If the permeability is low, then fluids will flow less easily and more slowly through the material.

General Measurement

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended. For example, "GPT" or "gal/Mgal" means U.S. gallons per thousand U.S. gallons and "ppt" means pounds per thousand U.S. gallons.

Unless otherwise specified, mesh sizes are in U.S. Standard Mesh.

The micrometer (μm) may sometimes be referred to herein as a micron.

Converted to SI units, 1 darcy is equivalent to 9.869233× 10$^{-13}$ m$^2$ or 0.9869233 (μm)$^2$. This conversion is usually approximated as 1 (μm)$^2$.

The conversion between pound per gallon (lb/gal or ppg) and kilogram per cubic meter (kg/m$^3$) is: 1 lb/gal=(0.4536 kg/lb)×(gal/0.003785 m$^3$)=120 kg/m$^3$.

The conversion between pound per thousand gallons (lb/Mgal) and kilogram per cubic meter (kg/m$^3$) is: 1 lb/Mgal=(0.4536 kg/lb)×(Mgal/3.785 m$^3$)=0.12 kg/m$^3$.

General Approach

Embodiments described herein may provide systems and methods for a low density invert emulsion fluid that enables an alternate flow path, such as for use with shunt tubes, for extended reach gravel packing. A subterranean treatment fluid may have oil as an external phase and a gelling agent in the internal phase.

Certain embodiments may involve directing assemblies of sand control screens equipped with alternate flow paths or shunt tubes, externally mounted on an outside of screens, or internally mounted (between screen filtering media and so-called base pipe). Alternative embodiments may not involve directing assemblies of sand control screens equipped with alternate flow paths or shunt tubes, externally mounted on the outside of the screens, or internally mounted (between screen filtering media and so-called base pipe).

Certain embodiments may be used with non-aqueous external phase fluids, for example, invert emulsion as the gravel carrier fluid wherein the internal aqueous phase can be gelled up with branched hetero polysaccharides such as xanthan, diutan, scleroglucan, etc. to impart carrying capacity to the emulsion. Due to its non-aqueous external phase, the proposed system is compatible with non-aqueous fluids (NAF) used during drilling operations and while running the screens. This compatibility may be crucial to the success of using this type of carrier fluid system in a NAFPac technique. Certain embodiments may satisfy fluid requirement of a low density non-aqueous gravel pack carrier fluid used in conjunction with alternate path gravel pack techniques.

A gelled internal phase invert emulsion system may be a low density fluid. Low density may be less than the density of water. In certain embodiments, the fluid may have a density less than approximately 8.3 ppg. In certain embodiments, the fluid may have a density less than approximately 7.8 ppg. The fluid may exhibit excellent stability and sand suspension characteristics that are crucial from a carrying perspective. The system may operate up to approximately 180° F. or higher.

In certain embodiments, the fluid may have one or more of the following properties:
Density of gravel packing fluid less than 8.3 ppg;
A sand settling of less than 10% at static bottom hole conditions (180° F.) for 60 minutes;
Compatibility with low density mud formulation;
Fluid can be broken to 10 cP in 3-4 days; and
Non-Newtonian fluid.

Non-aqueous drilling fluids may function well for drilling operations involving shale formations. At the same time when gravel pack operations are to be carried out, however, compatibility between drilling fluids and gravel packing fluids becomes a critical parameter for successful completion. If the gravel packing fluid is also non-aqueous, then the issue of compatibility between drilling fluids and gravel packing fluids may not arise.

In certain embodiments, a composition of non-aqueous gravel carrying fluid may include oil as an external phase and a viscosified internal phase.

Fluid Composition

The subterranean treatment fluid may contain one or more components.

Gelled Aqueous Internal Phase

A gelled aqueous internal phase may include one or more components.

In certain embodiments, the gelled aqueous internal phase may include one or more hetero polysaccharides. The one or more hetero polysaccharides may include xanthan, diutan, scleroglucan, etc. In certain embodiments, the gelled aqueous internal phase may include clarified diutan. A viscosity-increasing agent may be selected from the group consisting of: diutan, one or more clarified diutans, one or more water-soluble derivatives of diutan, and any combination thereof.

Diutan gum may be a polysaccharide designated as "S-657," which is prepared by fermentation of a strain of

*sphingomonas.* Diutan's structure has been described as a hexasaccharide having a tetrasaccharide repeat unit in the backbone that comprises glucose and rhamnose units and di-rhamnose side chain. It is believed to have thickening, suspending, and stabilizing properties in aqueous solutions. Diutan is composed principally of carbohydrates, about 12% protein, and about 7% (calculated as 0-acetyl) acyl groups, the carbohydrate portion containing about 19% glucuronic acid, and the neutral sugars rhamnose and glucose in the approximate molar ratio of about 2:1. Details of diutan gum structure may be found in an article by Diltz et al., "Location of O-acetyl Groups in S-657 Using the Reductive-Cleavage Method," CARBOHYDRATE RESEARCH, Vol. 331, p. 265-270 (2001), which is incorporated by reference in its entirety herein. Details of preparing diutan gum may be found in U.S. Pat. No. 5,175,278, which is incorporated by reference in its entirety herein. A suitable source of diutan may be "GEOVIS XT," which is commercially available from Kelco Oil Field Group, Houston, Tex.

The hetero polysaccharide, such as clarified diutan, may be present in an amount of approximately 0.25 lbs/Mgal of the gelled internal phase to approximately 200 lbs/Mgal of the gelled internal phase. In certain embodiments, the clarified diutan may be present in an amount of approximately 1 lbs/Mgal of the gelled internal phase to approximately 100 lbs/Mgal of the gelled internal phase. In certain embodiments, the clarified diutan may be present in an amount of approximately 20 lbs/Mgal of the gelled internal phase to approximately 40 lbs/Mgal of the gelled internal phase. In certain embodiments, the clarified diutan may be present in an amount of approximately 30 lbs/Mgal of the gelled internal phase.

In certain embodiments, the gelled aqueous internal phase may include a salt or brine. In certain embodiments, the brine is an alkali metal halide salt brine. In certain embodiments, the brine is a potassium chloride brine. In certain embodiments, salts may include KCL, NaCl, NaBr, KBr, and combinations thereof. In certain embodiments the brine may be approximately 0.5% to approximately 7% salt. In certain embodiments, the potassium chloride brine may be approximately 7% KCl. The salt or brine may be present in an amount of approximately 40% v/v to approximately 70% v/v, or approximately 60% v/v. This ratio is volume of brine to overall volume of subterranean treatment fluid. The salt or brine may have a density of approximately 8.4 ppg to approximately 9.0 ppg, or approximately 8.7 ppg.

The combination of the one or more hetero polysaccharides with the salt or brine may form the gelled aqueous internal phase.

The gelled aqueous internal phase may also include one or more additives. Additives may include a gelling agent. Additives may include a hydrophobically modified polymer such as poly dialkyl amino alkyl acrylate. In certain embodiments, the poly dialkyl amino alkyl acrylate may be present in an amount of approximately 0.05% to approximately 10% v/v of the subterranean treatment fluid. In certain embodiments, the poly dialkyl amino alkyl acrylate may be present in an amount of approximately 0.5% to approximately 5% v/v of the subterranean treatment fluid. In certain embodiments, the poly dialkyl amino alkyl acrylate may be present in an amount of approximately 0.8% to approximately 1/0% v/v of the subterranean treatment fluid.

A plurality of particulates, such as gravel particulates, may be added to the gelled aqueous internal phase. Particulates are known and commercially available.

Oil-Based External Phase

An oil-based external phase may include one or more components. In certain embodiments, the oil-based external phase may include one or more mineral oils. The one or more mineral oils may be hydrogenated low viscosity mineral oils. The one or more mineral oils may include petroleum distillate and hydro treated light hydrocarbons. The one or more mineral oils may include, but are not limited to, Escaid 110, Escaid 111, Escaid 115, Saraline 185, EDC-95-11, Conoco lvt, Mentor 26, Mentor 28, MIV 65 neutral, Petrofree LV or combinations thereof. In certain embodiments, the one or more mineral oils may be present in an amount of approximately 30% v/v to approximately 60% v/v, or approximately 40% v/v of the subterranean treatment fluid.

Acid Composition

Other components of the subterranean treatment fluid may include one or more acid compositions. A purpose of the acid composition may be to break the subterranean treatment fluid once the gravel packing treatment is completed. An intention may be to break the fluid down to an apparent viscosity of 10 cP at BHST in about 96 hours. In certain embodiments, the acid composition may be present in an amount of approximately 0.1% to approximately 20% v/v of the subterranean fluid. In certain embodiments, the acid composition may be present in an amount of approximately 1% to approximately 10% v/v of the subterranean fluid. In certain embodiments, the acid composition may be present in an amount of approximately 2% to approximately 6% v/v of the subterranean fluid.

The acid composition may include at least one acid selected from: formic acid, acetic acid, propionic acid, lactic acid, glycolic acid, and combinations thereof.

The acid composition may include at least one acid-generating compound selected from: an ester; an aliphatic polyester; an ortho ester; a poly(ortho ester); an ortho ether; a poly(ortho ether); a lactide; a poly(lactide); a glycolide; a poly(glycolide); an ε-caprolactone; a poly(ε-caprolactone); a hydroxybutyrate; a poly(hydroxybutyrate); an anhydride; a poly(anhydride); an aliphatic carbonate; an aliphatic polycarbonate; an amino acid; a poly(amino acid), and combinations thereof.

The acid composition may also be a combination of the at least one acid and the at least one acid-generating compound.

Other Components

Other components of the subterranean treatment fluid may include DURATONE (organo lignite) and/or ADAPTA (acrylate copolymer). The DURATONE and/or ADAPTA may be present in an amount of approximately 5 lbs/Mgal to approximately 10 lbs/Mgal, or approximately 11.43 lbs/Mgal. These components may be part of the external mineral oil phase.

In certain embodiments, other components of the subterranean treatment fluid may include a stabilizer, a scale inhibitor, a corrosion inhibitor, a bactericide, a biocide, a relative permeability modifier, a chelant, a hydrate inhibitor, a sulfide scavenger, and combinations thereof.

In certain embodiments, the stabilizer may be chosen from a fatty acid tallow oil, a quaternary amine, a water-soluble, hydrophobically modified polymer and combinations thereof. In certain embodiments, the stabilizer may be one or more fatty acid, tall-oil, reaction product with diethylenetriamine, maleic anhydride, tetraethylenepentamine, and triethylenetetramine. This component may be part of the external mineral oil phase. In certain embodiments, the stabilizer may be present in an amount of approximately 0.1% to approximately 20% v/v of the subterranean fluid. In certain embodiments, the stabilizer may be present in an amount of approximately 1% to approximately 10% v/v of the subterranean fluid. In certain embodiments, the stabilizer may be present in an amount of approximately 2% to approximately 6% v/v of the subterranean fluid.

Fluid Properties

The ratio of internal phase to external phase may be approximately 40:60 to approximately 70:30, or approximately 60:40.

Density of the subterranean treatment fluid may be less than approximately 8.3 ppg. In certain embodiments, the density of the subterranean treatment fluid may be less than approximately 8.0. In certain embodiments, the density of the subterranean treatment fluid may be approximately 7.8 ppg.

Methods of Use

Methods of use may include providing subterranean treatment fluids as described herein. Methods may include contacting a portion of a subterranean formation with the subterranean treatment fluid. Methods may also include depositing at least a portion of the plurality of particulates in a portion of the subterranean formation to form a gravel pack.

The method may also include breaking of the gelled aqueous internal phase. The breaking may utilize an acid composition. The acid composition comprises an acid in a concentration range of approximately 1.0 gal/Mgal to approximately 15.0 gal/Mgal. These measurements may be gal of acid per Mgal of gelled internal aqueous phase. The broken gelled aqueous internal phase may have an apparent viscosity number of less than approximately 10 cP in about 72 to about 96 hours.

EXAMPLES

Experimental Procedure

1) In a 1 lit. Waring blender jar, 600 mL of 7% KCL was taken and stirred at 15 rpm.
2) A 10 gal/Mgal solution of hydrophobically modified polymer, such as poly dialkyl amino alkyl acrylate, was added very slowly into a 7% KCl solution in a Waring blender and stirred for 3 minutes.
3) Clarified 30 lb/Mgal of Diutan was slowly added in the resulting solution of 7% KCl with hydrophobically modified polymer and stirred it for 3 minutes. The resulting mixture was mixture A.
4) In another Waring blender, 350 gal/Mgal of mineral oil and 40 gal/Mgal of fatty acid, tall-oil based quaternary ammonium compound were stirred for 5 minutes. The resulting mixture was mixture B.
5) Mixture B was slowly poured into mixture A and stirred for 5 to 8 minutes at 25-30 rpm. This resulted in an oil external emulsion.

Example 1

A subterranean treatment fluid was prepared as follows:

| Sr. No. | Constituent | Concentration |
|---|---|---|
| 1 | Clarified Diutan (WG-38) | 30 lbs/Mgal |
| 2 | KCl | 7% |
| 3 | Mineral Oil (Escaid 110) | 350 gal/Mgal |
| 4 | Fatty acid tallow oil along with quaternary amine (Invermul NT) | 50 gal/Mgal |
| 5 | Organo lignite (Duratone)/ Acrylate copolymer (ADAPTA) | 11.43 lbs/Mgal |

The following are results of a sand suspension test.

| Time (min) | Height of Clear Fluid (ml) 6 ppg 30/50 Econoprop Proppant |
|---|---|
| 5 | 1 |
| 10 | 2 |
| 20 | 4 |
| 30 | 4 |
| 40 | 5 |
| 50 | 5 |
| 60 | 5 |
| Initial height | 100 ml |
| % settling in 60 min | 5 |

The following illustrates rheology of the fluid.

| RPM (Shear rate sec$^{-1}$) | Dial Reading on Fann 35 Viscometer (R1 rotor, B1 bob, F1 spring combination) | |
|---|---|---|
| | RT | 180° F. |
| 600 (1021) | 72 | 65 |
| 300 (511) | 60 | 33 |
| 200 (340) | 53 | 18 |
| 100 (170) | 43 | 15 |
| 6 (10.2) | 12 | 06 |
| 3 (5.1) | 9 | 04 |

Figure 1:
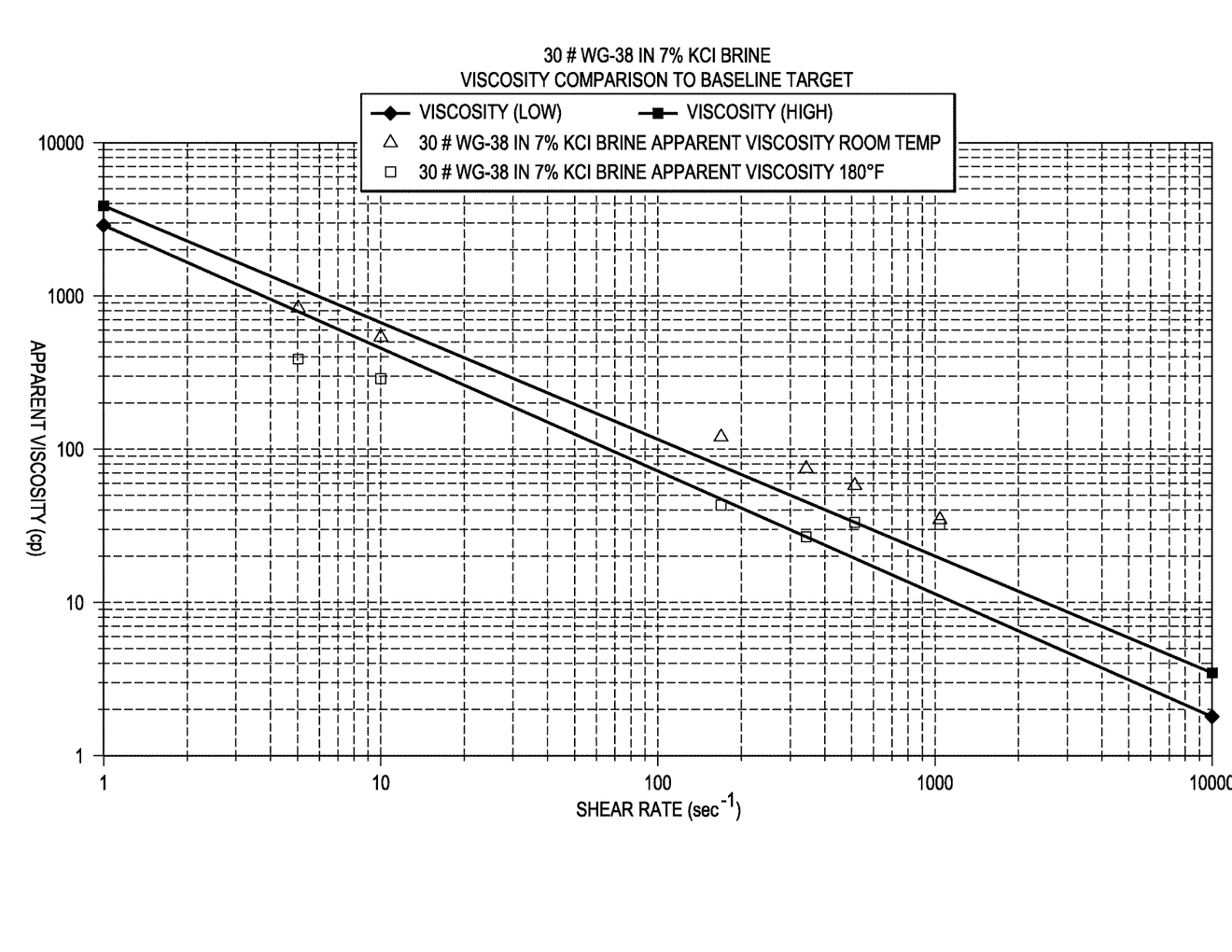
FIG. 1 is a graph of rheology of a fluid according to an exemplary embodiment.

FIG. 1 illustrates a graph of rheology of the fluid. The rheology of this fluid fulfills the rheology criterion described herein.

The following are results of a fluid compatibility test. The fluid formulation described in the following table is the non-aqueous mud formulation.

| 75/25 OWR Product | Density 7.7 ppg Concentration/bbl |
|---|---|
| Base Oil | 0.692 |
| Drill Water | 0.238 |
| EZ MUL NT | 5 |
| DURATONE | 4 |
| GELTONE II | 10 |
| SUSPENTONE | 2 |
| VIS PLUS | 2 |
| LIME | 6 |
| CaCl$_2$ | 23.5 |

The proposed non-aqueous low density subterranean treatment fluid was found to have a density of 7.7 ppg.

When this non-aqueous low density subterranean treatment fluid was mixed with the non-aqueous mud formulation above, it was observed that it was not giving a peanut butter consistency and therefore is compatible.

Example 2

A subterranean treatment fluid was prepared as follows:

| Sr. No. | Constituent | Concentration |
|---|---|---|
| 1 | Clarified Diutan (WG-38) | 30 lbs/Mgal |
| 2 | 7% KCl | 600 gal/Mgal |
| 3 | Mineral Oil (Escaid 110) | 350 gal/Mgal |
| 4 | Fatty acid tallow oil along with quaternary amine (Invermul NT) | 40 gal/Mgal |
| 5 | Hydrophobically modified polymer (HPT-1) | 10 gal/Mgal |

The following are results of a sand suspension test.

| Time (min) | Height of Clear Fluid (ml) 6 ppg 30/50 Econoprop Proppant |
|---|---|
| 5 | 0 |
| 10 | 0 |
| 20 | 0 |
| 30 | 0 |
| 40 | 0 |
| 50 | 0 |
| 60 | 0 |
| Initial height | 100 ml |
| Conclusion | Passed |

The following illustrates rheology of the fluid.

| RPM (Shear rate sec$^{-1}$) | Dial Reading on Fann 35 Viscometer (R1 rotor, B1 bob, F1 spring combination) | |
|---|---|---|
| | RT | 180° F. |
| 600 (1021) | 80 | 71 |
| 300 (511) | 65 | 62 |

Example 3—Break Test

The following illustrates break test of the fluid

| Time in hrs | Apparent Viscosity in cP at 300 RPM (511-1 Shear Rate) (R1 rotor, B1 bob, F1 spring combination) | |
|---|---|---|
| | Breaker -Formic Acid 8 gal/Mgal | Breaker -Formic Acid 10 gal/Mgal |
| 0 | 72 | 72 |
| 24 | 68 | 64 |
| 48 | 40 | 24 |
| 72 | 15 | 10 |
| 96 | 06 | 04 |
| Conclusion | Passed | Passed |

The following are results of a fluid compatibility test. The fluid compatibility test of non-aqueous low density subterranean gravel pack/carrier treatment fluid did not show any incompatibility with the non-aqueous mud formulation. The mixture remains in flowable form and do not show any peanut butter consistency.

The proposed non-aqueous low density subterranean treatment fluid was found to have a density of 7.7 ppg.

CONCLUSION

Therefore, the present invention is well adapted to attain the ends and advantages mentioned as well as those that are inherent therein. Preferably, after any well treatment, a step of producing hydrocarbon from the subterranean formation is the desirable objective.

The exemplary compositions disclosed herein may directly or indirectly affect one or more components or pieces of equipment associated with the preparation, delivery, recapture, recycling, reuse, and/or disposal of the disclosed compositions. For example, the disclosed compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary compositions. The disclosed compositions may also directly or indirectly affect any transport or delivery equipment used to convey cement compositions to a well site or downhole such as, for example, any transport vessels, conduits, pipelines, trucks, tubulars, and/or pipes used to compositionically move the cement compositions from one location to another, any pumps, compressors, or motors (e.g., topside or downhole) used to drive the compositions into motion, any valves or related joints used to regulate the pressure or flow rate of the compositions, and any sensors (i.e., pressure and temperature), gauges, and/or combinations thereof, and the like. The disclosed compositions may also directly or indirectly affect the various downhole equipment and tools that may come into contact with the compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

Although the foregoing description is directed to the preferred embodiments of the disclosure, it is noted that other variations and modifications will be apparent to those skilled in the art, and may be made without departing from the spirit or scope of the disclosure. Moreover, features described in connection with one embodiment of the disclosure may be used in conjunction with other embodiments, even if not explicitly stated above.

What is claimed is:

1. A subterranean treatment fluid composition comprising:
   an invert emulsion comprising a clarified diutan-based gelled aqueous internal phase and a mineral oil-based external phase, and
   an acid composition,
   wherein the acid composition comprises at least one of:
      an acid selected from a group consisting of: formic acid, acetic acid, propionic acid, lactic acid, glycolic acid, and combinations thereof, and
      an acid-generating compound selected from the group consisting of: an ester; an aliphatic polyester; an ortho ester; a poly(ortho ester); an ortho ether; a poly(ortho ether); a lactide; a poly(lactide); a glycolide; a poly(glycolide); an ε-caprolactone; a poly(ε-caprolactone); a hydroxybutyrate; a poly(hydroxybutyrate); an anhydride; a poly(anhydride); an aliphatic carbonate; an aliphatic polycarbonate; an amino acid; a poly(amino acid), and combinations thereof,
   wherein the composition has a density less than water at downhole conditions.

2. The composition of claim 1, wherein the clarified diutan is present in the composition at approximately 0.25 lbs/Mgal to approximately 200 lbs/Mgal.

3. The composition of claim 2, wherein the clarified diutan is present in the composition at approximately 30 lbs/Mgal.

4. The composition of claim 1, wherein the clarified diutan is in a potassium chloride brine to form the gelled aqueous internal phase.

5. The composition of claim 4, wherein the gelled aqueous internal phase has a density of approximately 8.7 ppg.

6. The composition of claim 1, wherein the clarified diutan is gelled in a brine comprising one or more alkali metal halide salts.

7. The composition of claim 1, wherein the ratio of the clarified diutan-based gelled aqueous internal phase to the mineral oil-based external phase is approximately 60:40.

8. The composition of claim 1, further comprising an additive chosen from the group consisting of: a brine, a salt, a stabilizer, a scale inhibitor, a corrosion inhibitor, a bactericide, a biocide, a relative permeability modifier, and combinations thereof.

9. The composition of claim 8, wherein the additive is the stabilizer, and the stabilizer is selected from a group consisting of: a fatty acid tallow oil, a quaternary amine, a water-soluble hydrophobically modified polymer, and combinations thereof.

10. A method comprising:
    providing a subterranean treatment fluid with a density less than water at downhole conditions, the subterranean treatment fluid comprising:
       an invert emulsion with a clarified diutan-based gelled aqueous internal phase and a mineral oil-based external phase, and
       an acid composition, wherein the acid composition comprises at least one of:
          an acid selected from a group consisting of: formic acid, acetic acid, propionic acid, lactic acid, glycolic acid, and combinations thereof, and
          an acid-generating compound selected from the group consisting of: an ester; an aliphatic polyester; an ortho ester; a poly(ortho ester); an ortho ether; a poly(ortho ether); a lactide; a poly(lactide); a glycolide; a poly(glycolide); an ε-caprolactone; a poly(ε-caprolactone); a hydroxybutyrate; a poly(hydroxybutyrate); an anhydride; a poly(anhydride); an aliphatic carbonate; an aliphatic polycarbonate; an amino acid; a poly(amino acid), and combinations thereof,
       a plurality of particulates,
    contacting a portion of a subterranean formation with the subterranean treatment fluid; and
    depositing at least a portion of the plurality of particulates in a portion of the subterranean formation to form a gravel pack.

11. The method of claim 10, further comprising breaking of the gelled aqueous internal phase.

12. The method of claim 11, wherein the breaking utilizes the acid composition.

13. The method of claim 12, wherein the acid composition comprises an acid in a concentration range of approximately 1.0 gal/Mgal to approximately 15.0 gal/Mgal.

14. The method of claim 13, wherein the broken gelled aqueous internal phase has an apparent viscosity number of less than approximately 10 cP in about 72 to about 96 hours.

15. The method of claim 10, further comprising mixing the subterranean treatment fluid using mixing equipment.

16. The method of claim 10, wherein the subterranean treatment fluid is introduced into the subterranean formation using one or more pumps.

* * * * *